United States Patent
Branco et al.

(10) Patent No.: US 10,765,121 B2
(45) Date of Patent: Sep. 8, 2020

(54) SUGAR-FREE BREAD

(71) Applicant: Mauri Technology B.V., Made (NL)

(72) Inventors: Pedro Branco, Made (NL); Maarten van Oort, Made (NL); Damien Wach, Made (NL)

(73) Assignee: Mauri Technology B.V., Made (NL)

( * ) Notice: Subject to any disclaimer, the term of this patent is extended or adjusted under 35 U.S.C. 154(b) by 236 days.

(21) Appl. No.: 15/642,881

(22) Filed: Jul. 6, 2017

(65) Prior Publication Data

US 2018/0007918 A1 Jan. 11, 2018

(30) Foreign Application Priority Data

Jul. 8, 2016 (EP) ..................................... 16178550

(51) Int. Cl.
| | |
|---|---|
| *A21D 13/062* | (2017.01) |
| *A23L 29/244* | (2016.01) |
| *A23L 33/125* | (2016.01) |
| *A23L 29/00* | (2016.01) |
| *A23L 33/22* | (2016.01) |
| *A21D 8/04* | (2006.01) |
| *A23L 33/00* | (2016.01) |
| *A21D 2/18* | (2006.01) |
| *A21D 10/00* | (2006.01) |

(52) U.S. Cl.
CPC ........... *A21D 13/062* (2013.01); *A21D 2/181* (2013.01); *A21D 8/042* (2013.01); *A21D 8/047* (2013.01); *A21D 10/005* (2013.01); *A23L 29/06* (2016.07); *A23L 29/244* (2016.08); *A23L 33/00* (2016.07); *A23L 33/125* (2016.07); *A23L 33/22* (2016.07)

(58) Field of Classification Search
CPC .................................................. A21D 13/062
See application file for complete search history.

(56) References Cited

U.S. PATENT DOCUMENTS 2,801,921 A * 8/1957 Moses .................... A21D 8/042
426/61
2011/0129572 A1 6/2011 Meier et al.

FOREIGN PATENT DOCUMENTS

| DE | 4426662 A1 | 1/1996 | |
|---|---|---|---|
| EP | 1541027 A1 | 6/2005 | |
| RU | 1785418 A3 * | 12/1992 | ............... A21D 8/02 |

OTHER PUBLICATIONS

Zech, et al. Invertase from *Saccharomyces cerevisiae*: Reversible inactivation by components of industrial molasses media. Enzyme and Microbial Technology, 17: 11-16, 1995. (Year: 1995).*
Siepmann et al., "Overview of Sourdough Technology: from Production to Marketing;" Food Bioprocess Technol.; 11:242-270 (2018).
Escrivá, Consuelo, and María Antonia Martínez-Anaya. "Influence of enzymes on the evolution of fructosans in sourdough wheat processes." European Food Research and Technology 210.4 (2000): 286-292.
Radovanovic, Ana M., et al. "Characterization of Bread Enriched with Jerusalem Artichoke Powder Content." Journal of Food and Nutrition Research 2.12 (2014): 895-898.
Meyer, Diederick, and Brigitte Peters. "Bakery-Enhancing the nutritional value of bread with inulin." Agro Food Industry Hi-Tech 20.3 (2009): 48.

* cited by examiner

*Primary Examiner* — Jenna A Watts
(74) *Attorney, Agent, or Firm* — Hoffmann & Baron, LLP

(57) ABSTRACT

The invention relates to a bread dough, and a bread obtained by baking the dough, where the dough includes:
  one or more fructans having two or more fructosyl moieties linked by a beta(2,1) bond,
  one or more inulinases (EC 3.2.1.7 and EC 3.2.1.80), and
  one or more invertases (3.2.1.26),
the bread dough having a total added sugar content of 0-5 wt. %, based on dry weight.

23 Claims, No Drawings

SUGAR-FREE BREAD

The invention relates to a bread dough, to a method for preparing the dough, to a method for baking a bread from the dough, to a sugar replacement system for bread, and to a bread pre-mix.

BACKGROUND OF THE INVENTION

Applicants claim priority from EP 16178550.6 filed 8 Jul. 2017, which is incorporated herein by reference.

Sugar is an ingredient for bread that adds sweetness to the bread, which is highly appreciated by many consumers as a pleasant taste. It has also been used to mask the off-flavour of certain additives, such as calcium propionate (an anti-mould agent), that are or have been used in the preparation of bread. The amount of sugar added to typical bread recipes can vary, depending on the type of bread and the typical demands for that bread in terms of taste, flavour, off-flavour masking, softness and shelf life. Known recipes exist, wherein the amount of sugar added exceeds 10 wt. %, or even exceeds 15 wt. % or 20 wt. %, based on dry weight.

However, a high daily intake of bulk sugars, such as sucrose, fructose and glucose, is considered to impose a serious risk to health. Excessive amounts of sugar intake are for instance considered to contribute to an increased risk of obesity, insulin resistance and type 2 diabetes. Further, sugar is a contributor to tooth decay. Various alternatives to sugars are known in food technology in order to impart a sweet taste to foods and beverages. These include high-intensity sweeteners and various polyols. Examples of high-intensity sweeteners include aspartame, saccharin, sucralose and steviol, neotame and Ace-K. An example of a polyol is sorbitol However, these compounds also offer disadvantages, varying from regulatory restrictions, distrust by a substantial part of the public due to their artificial nature (for the synthetic sweeteners), observance of an off-flavour and/or unpleasant mouthfeel by a substantial number of the consumers and bad physiological tolerance by certain consumers (e.g. sorbitol can have a laxative effect in high dosage) to technological problems in the food application. Namely, if one simply replaces the sugar for any other sweetener, this has unpredictable effects on other qualities of the dough and/or the bread, e.g. dough stickiness, dough extensibility, loaf volume, crumb softness, crust colour, etc.

Thus, there is a need for an alternative bread having a sweet taste, containing less or no added sugar without needing to include high intensity sweeteners or a polyol (like sorbitol), whilst maintaining satisfactory organoleptic properties in addition to sweetness, having a satisfactory shelf life, in particular such a bread which can be made essentially fully from natural ingredients and/or that has a reduced caloric value compared to a conventional bread sweetened with a sugar, in particular glucose, fructose or sucrose.

SUMMARY OF THE INVENTION

It has now been found that bread made from a bread dough comprising a specific combination of enzymes and a specific saccharide has satisfactory organoleptic properties, including a sweet taste, and satisfactory shelf life.

Accordingly, the present invention relates to a bread dough comprising one or more fructans having at least two fructosyl moieties linked by a beta(2,1) bond, at least one inulinase (EC 3.2.1.7 and EC 3.2.1.80) and at least one invertase (3.2.1.26), the bread dough having a total added sugar content of 0-5 dry wt. % and/or a total sugar content of 0-15 wt. %, preferably 0-10 wt. %, based on dry weight.

Further, the present invention relates to a bread dough comprising:
 one or more fructans having at least two fructosyl moieties linked by a beta(2,1) bond, the total content of said one or more fructans being in the range of 1-10 wt. %, based on dry weight;
 at least one inulinase (EC 3.2.1.7 and EC 3.2.1.80), the total content of said inulinase(s) being 5-1000 ppm, based on dry weight;
 and at least one invertase (3.2.1.26), the total content of said invertase(s) being 5-2000 ppm, based on dry weight.

The bread dough, or bread obtainable in accordance with the invention, usually has a total added sugar content of 15 wt. % or less based on dry weight and/or a total sugar content of 20 wt. % or less, based on dry weight. The bread dough preferably has a total added sugar content of 0-10 wt. %, in particular of 0-5 wt. %, based on dry weight. The bread dough preferably has a total sugar content of 0-10 wt. %, based on dry weight.

Further the invention relates to a method for preparing a bread dough according to the invention.

Further, the invention relates to a method for baking a bread from a bread dough according to the invention.

Further, the invention relates to a baked bread made from a bread dough according to the invention.

Further, the invention relates to a sugar replacement system for a bread comprising one or more inulinases (EC 3.2.1.7), one or more invertases (3.2.1.26) and one or more fructans having two or more fructosyl moieties linked by a beta(2,1) bond.

Further, the invention relates to a powdered bread pre-mix for a bread comprising flour, one or more fructans having two or more fructosyl moieties linked by a beta(2,1) bond, one or more inulinases (EC 3.2.1.7) and one or more invertases (3.2.1.26), the pre-mix having a total sugar content of 0-5 wt. %.

DETAILED DESCRIPTION OF THE INVENTION

It has surprisingly been found possible to provide a bread with a relatively high sweetness, considering the amount of added fructan needed to achieve a certain sweetening effect, when employed in combination with the inulinase and the invertase. In particular, it has been found possible to provide a bread having a sweetness that is about the same or higher than the sweetness of a reference bread made from a dough wherein said fructan or fructans have been replaced by a same amount of sucrose and having otherwise the same composition. This has been accomplished without needing any added sugar or other further sweetener. This has been found possible without adverse effects to other important properties, such as crumb softness, loaf volume or the like. To the contrary, it was found that the combination of said fructans and the inulinase (endo-inulinase and exo-inulinase) and the invertase had a positive effect on loaf volume, on crumb softness and/or on the total amount of yeast required to obtain a normal fermentation and loaf volume. Thus, the invention in particular provides a bread dough for a sweet bread, a sweet bread, a sugar replacement system or a powdered bread pre-mix that is essentially free of high-intensity sweeteners and/or other sweeteners that—according to food regulations e.g. in the USA or Europe—need to identified on the food label of said products. Thus, advantageously a dough, bread, sugar replacement system, or pre-mix of the invention is free of aspartame, saccharin, sucralose, steviol, neotame, Ace-K. and sorbitol.

Further, it has been found possible to provide a bread having a considerably lower caloric value, compared to a reference bread having about the same sweetness as a bread according to the invention wherein the bread has been sweetened with a sugar. The advantageous effect on caloric value resides does not only need to reside in the reduced caloric value of the fructan, compared to sugar, but also in that less fructan may be used in order to impart a similar sweetness. E.g. less than half the amount of an inulin (as the fructan) was needed than the amount of fructose (from high fructose corn syrup) in a reference bread in order to impart a similar sweetness.

Unless defined otherwise, all technical and scientific terms used herein have the same meaning as commonly understood by one of ordinary skill in the art.

For instance the term 'sweetness' is generally known in the art as relating to one of the five established basic tastes, i.e. on of the five established basic sensations produced when a substance in the mouth reacts with taste receptor cells located on taste buds in the oral cavity, in particular on the tongue. The other basic tastes are saltiness, sourness, bitterness and umami (savory taste). It is well established in the art how to measure sweetness by a taste panel by comparing different products.

The term "or" as used herein means "and/or" unless specified otherwise.

The term "a" or "an" as used herein means "at least one" unless specified otherwise.

The term "essential(ly)" is generally used herein to indicate that it has the general character or function of that which is specified. When referring to a quantifiable feature, this term is in particular used to indicate that it is more than 90%, more in particular more than 95%, even more in particular more than 98% of the maximum that feature. The term 'essentially free' is generally used herein to indicate that a substance is not present (below the detection limit achievable with analytical technology as available on the effective filing date) or present in such a low amount that it does not significantly affect the property of the product that is essentially free of said substance or that it is present in such a low amount (trace) that it does not need to be labeled on the packaged product that is essentially free of the substance. In practice, in quantitative terms, a product is usually considered essentially free of a substance, if the content of the substance is 0-0.1 wt. %, in particular 0-0.01 wt. %, more in particular 0-0.005 wt. %, based on total weight of the product in which it is present.

As used herein 'ppm' means parts per million based on weight.

The term "about" in relation to a value generally includes a range around that value as will be understood by the skilled person. In particular, the range is from at least 10% below to at least 10% above the value, more specifically from 5% below to 5% above the value.

When referring to a "noun" (e.g. a compound, an additive etc.) in singular, the plural is meant to be included, unless specified otherwise.

For the purpose of clarity and a concise description features are described herein as part of the same or separate embodiments, however, it will be appreciated that the scope of the invention may include embodiments having combinations of all or some of the features described.

When referred herein to enzymes in the dough, in particular an inulinase or invertase, these are extracellular enzymes having enzymatic activity, in particular inulinase activity respectively invertase activity. They are typically not part of the flour from which the dough is made (i.e. not originating from the same source as the flour), although they may be admixed with the flour prior to preparation of the dough. The fructan is also typically not part of the flour from which the dough is made (i.e. not originating from the same plant as the flour), although they may be admixed with the flour prior to preparation of the dough.

The inulinase is usually selected from fungal inulinases, in particular from *Aspergillus*; and plant inulinases, in particular from chicory.

The total inulinase content-on dry weight basis-in the dough usually is at least 5 ppm or less. It usually is 1000 ppm or less. The total inulinase content in the dough preferably is 10-200 ppm, more preferably 20-50 ppm.

Preferably, the dough comprises an inulinase having endo-inulinase activity and an inulinase having exo-inulinase activity, or an inulinase having both endo-inulinase activity exo-inulinase activity. Exo- and endo-inulinase activity can be determined by sugar analysis using HPLC (high performance liquid chromatography) or HPAE (high performance anion exchange chromatography). E.g. High-Performance Anion-Exchange chromatography with Pulsed Amperometric Detection (HPAE-PAD) is widely used for determination of carbohydrates. A particularly suitable system is the Thermo Scientific™ Dionex™ ICS-5000 with a CarboPac column. Details about the methodology can, e.g., be found In Thermo Scientific's document BR52119_E 06/13S. E.g., available via http://tools.thermofisher.com/content/sfs/brochures/BR-52119-Carbohydrate-Analysis-HPAE-PAD-BR52119-EN.pdf.

Although the presence of only an endo-inulinase activity or exo-inulinase activity is in principle sufficient to impart a sweetening effect, compared to a bread made with a dough wherein the sugar has been replaced by the fructan but without the addition of the inulinase, the presence of both an endo-inulinase activity and an exo-inulinase activity has been found to have a synergistic effect on sweetness per amount of added fructan. If both an endo-inulinase and an exo-inulinase are present, they are preferably present in a weight to weight ratio in the range of 10:90 to 90:10, in particular in a weight to weight ratio of 60/40 to 40/60.

The invertase is usually selected from fungal invertases, bacterial invertases and plant invertases. One or more fungal invertases are preferably selected from *Aspergillus* invertases, *Penicillium* invertases and yeast invertases. Particularly preferred is a yeast invertase, such as a *Saccharomyces* invertase or a *Candida* invertase. In particular, good results have been achieved with a *Saccharomyces* invertase (a *Saccharomyces cerevisiae* invertase). Examples of bacterial invertases which may in particular be employed are *Brevibacterium* invertases and *Pseudomonas* invertases.

The total invertase content on dry weight basis—in the dough usually is at least 5 ppm. It usually is 2000 ppm or less. Preferably, the total invertase content in the dough is 50-1000 ppm, more preferably about 100-300 ppm.

In combination with the inulinase, the invertase has been found to have a positive effect on sweetness. Further, a bread according to the invention made from a dough, in particular a white wheat bread, was found to have a more desirable, brown, colour, compared to bread made from a dough that did not comprise the invertase but had otherwise the same composition.

The one or more fructans are generally selected from the group consisting of fructans with the formula $G_mFn_n$, wherein G represents glycosyl; m is the number of glucosyl units, m, being 0 or 1; F represents fructosyl; and n is the number of fructosyl units. n is at least 1 (if m is 1), preferably at least 2, in particular 3 or more. Generally n is 60 or less, preferably 30 or less, in particular 20 or less, more in particular 10 or less.

The total content of fructan(s) having two or more fructosyl moieties linked by a beta(2,1) bond—on dry weight basis—in the dough is usually more than 0.5 wt. %, preferably at least 1 wt. %, more preferably at least 2 wt. %, in particular about 3 wt. % or more. In particular in view of olfactory properties, such as flavour, said total content of fructans usually is about 10 wt. % or less, preferably 8 wt. % or less, more preferably 7 wt. % or less, in particular 6 wt. % or less, more in particular about 5 wt. % or less.

Usually at least a substantial part of the fructans, preferably at least 60 wt. %, more preferably 90-100 wt. % of the fructans is formed by one or more fructans selected from the group of inulins and inulin hydrolysates. Inulin hydrolysates are usually a mixture of saccharides having one terminal glucosyl moiety and further consisting of fructosyl units and saccharides consisting of fructosyl units. A part of the hydrolysate may be formed of monosaccharides. The number average degree of polymerisation of the inulin or inulin hydrolysate typically is more than 2, in particular 3 or more, more in particular 4 or more. The number average degree of polymerisation of the inulin or inulin hydrolysate usually is less than 60, preferably 30 or less, in particular 20 or less, more in particular 10 or less.

A preferred source for the inulin or inulin hydrolysate is chicory. Other suitable sources in particular include Jerusalem artichoke, onion, bananas, garlic, asparagus and wheat.

The bread dough is usually made from cereal flour, water (both flour and water can be in a usual ratio), and further comprises said fructan, inulinase and invertase. The cereal flour preferably is wheat flour. In particular good results have been achieved with refined wheat flour, to provide a white wheat bread. Further, it is considered that in particular a rye bread, a rye-wheat bread or a wheat-rye bread benefits from the present invention, because rye can impart a somewhat bitter taste to the bread, which may be ameliorated by the present invention. Usually, the dough also comprises a leavening agent, preferably a yeast, typically a baker's yeast. The leavening agent can be used in a usual amount. In an advantageous embodiment, less leavening agent, in particular less yeast is needed than in a comparative recipe without the inulinase, invertase and fructan.

The dough is preferably essentially free of added sugars, although in principle some sugar can be added if desired in a concentration of up to 15 wt. %, preferably 10 wt. % or less, more preferably 5 wt. % or less, in particular of up to 2 wt. %, more in particular of 1 wt. % or less, all based on dry weight. The amount of sugar added to typical bread recipes can vary, depending on the type of bread and the typical demands for that bread in terms of taste, flavour, off-flavour masking, softness and shelf life. Compared to a known recipe for a bread, the present invention allows the preparation of a comparable bread having a reduced sugar content.

The term 'added sugar(s)' is generally understood in the art of food technology. It distinguishes between intrinsic sugars (naturally present) and those added during processing. The phrase 'no added sugars' is an allowable label if no sugar (sugars, syrups, naturally-occurring sugars that are isolated from a whole food and concentrated so that sugar is the primary component) is added during processing, and likewise an added sugar content of 'x %' on a label is allowable to indicate that x % sugar is added during processing, see e.g. the FDA's Food Labeling Guide, version January 2013, e.g. available on Internet via http://www.fda.gov/food/guidanceregulation/guidancedocumentsregulatoryinformation/labelingnutrition/ucm064911.htm or http://www.fda.gov/downloads/food/newsevents/workshopsmeetingsconferences/ucm403514.pdf.

The dough may further comprise any usual bread dough ingredients, e.g. emulsifiers, e.g. lecithin; thickening agents, e.g. gums; fats/oils, such as triglycerides; salt; ascorbic acid, ammonium sulphate, bread flavouring agents and the like. These optional ingredients can be used in amounts known in the art.

Good results have been achieved without adding an emulsifier.

Good results have been achieved without adding oil/fat.

In an advantageous embodiment, the dough comprises one or more further enzymes to improve dough handling and/or bread properties. These enzymes are preferably selected from the group consisting of Bread dough according to any of the preceding claims, wherein the dough comprises one or more enzymes selected from the group consisting of amylases, phospholipases, proteases, amyloglucosidases, cellulases, glucose-oxidases, glycolipases, hemicellulases, lipases, mannanases, pentosanases and xylanases. It is particularly preferred to include a glucose-oxidases, and amylase and a xylanase.

The mixing of the dough ingredients can be done by any means known in the art, e.g. by a straight dough method or a sponge and dough method. In a straight dough method all ingredients placed together and mixed is a single kneading or mixing session to obtain the dough. In a sponge and dough method first part of the ingredients is mixed to form a first dough, which is known as the sponge and thereafter the rest of the ingredients are added to the sponge and mixed to form the final dough that is to be baked. Good results have been achieved with a straight dough method and with a sponge and dough method.

The baking of the bread can be done in any way known in the art, based on general common knowledge for the type of bread that is desired and the information disclosed herein.

Further details on methodology for providing the dough and dough ingredients, such as enzymes other than the inulinase and the invertase, and baking a bread are e.g. described in EP-A 1,541,027 of which the contents are incorporated by reference, in particular with respect to the enzyme sources and amounts of the enzymes (other than inulinase and invertase) mentioned herein.

Regarding the sugar replacement system and the powdered bread pre-mix, generally the same considerations apply for the inulinase, invertase and fructan as described above and in the claims. Thus, the same sources are in particular suitable and preferred. Thus, similar ratios for the ingredients are preferred.

For the powdered bread pre-mix, the above mentioned ranges for the same concentration ranges as for the dough may be directly applied. Thus the inulinase content in the powdered bread-pre-mix in particular is 5-1000 ppm, preferably10-200 ppm, more preferably 20-50 ppm; the invertase content is in particular 5-2000 ppm, preferably 50-1000 ppm, more preferably about 100-300 ppm; the total content of fructans in particular is in the range of 1-10 wt. %, preferably in the range of 2-7 wt. %, in particular in the range of 3-5 wt. %, all based on dry weight. The balance is generally formed by usual dough ingredients (other than water), such as flour, a leavening agent etc.

The sugar replacement system for a bread typically has higher contents of inulinase, invertase and fructan than the dough according to the invention, because other dough ingredients need not be present, although it may in particular comprise flour as a carrier). The weight to weight ratio of inulinase to invertase in a dough, sugar replacement system or dry pre-mix according to the invention usually is in the range of 1:10 to 4:1, preferably in the range of 1:6 to 2:1 more preferably in the range of 1:4 to 1:1. The weight to weight ratio of fructan to the sum of inulinase plus invertase usually is in the range of 10:1 to 20000:1, preferably in the range of 500:1 to 10000:1 more preferably in the range of 1000:1 to 6000:1. The sugar replacement system is usually essentially free of sugars.

The invention will now be illustrated by the following examples:

EXAMPLES

Breads were made using a conventional straight dough method, using the same conventional dough ingredients (flour, water, yeast, salt, calcium propionate, distilled monoglyceride, sodiumstearoyl-lactylate and ascorbic acid) each in a usual amount, but with the variations in recipe with respect to addition of sugar, fructan, invertase and inulinase (all percentages on the basis of dry weight):
Control Example 1 (C1): no added sugar, inulinase, invertase and fructan or any other further additives
Control Example 2 (C2): 12 wt. % high fructose corn syrup (HFCS) Examples 1-5 (E1-E5): 5 wt. % fructan (inulin) and varying amount of inulinase and invertase as indicated in Table 1:

TABLE 1

|  | C1 | C2 | E1 | E2 | E3 | E4 | E5 |
|---|---|---|---|---|---|---|---|
| ADDITIONAL DOUGH INGREDIENTSS |  |  |  |  |  |  |  |
| Inulin (wt. %) | 0 | 0 | 5% | 5% | 5% | 5% | 5% |
| Inulinase (ppm) | 0 | 0 | 25 | 25 | 50 | 100 | 100 |
| Invertase (ppm) | 0 | 0 | 100 | 300 | 100 | 300 | 100 |
| HFCS (wt. %) | 0 | 12 | 0 | 0 | 0 | 0 | 0 |

The processing attributes and product attributes are average values and were assessed by experienced bakers and (as far as the sweetness is concerned) by a consumer panel.

TABLE 2

|  | C1 | C2 | E1 | E2 | E3 | E4 | E5 |
|---|---|---|---|---|---|---|---|
| PROCESSING ATTRIBUTES |  |  |  |  |  |  |  |
| Dough dryness | 6 | 4 | 4 | 4 | 4 | 5 | 5 |
| Dough firmness | 6 | 4 | 4 | 4 | 4 | 5 | 5 |
| Dough elasticity | 5 | 6 | 4 | 4 | 4 | 5 | 6 |
| Dough extensibility | 5 | 4 | 6 | 6 | 6 | 5 | 5 |
| Dough development | 5 | 5 | 5 | 5 | 5 | 5 | 6 |
| Machinability | 5 | 5 | 5 | 5 | 5 | 5 | 5 |
| Fermentation stability | 5 | 5 | 5 | 5 | 5 | 5 | 5 |
| Dough Volume in % | 104 | 100 | 105 | 108 | 102 | 106 | 104 |
| PRODUCT ATTRIBUTES |  |  |  |  |  |  |  |
| Crust colour | 2.0 | 5.0 | 3 | 3.5 | 3.0 | 4.0 | 4.0 |
| Crumb resilience and moistness | 4 | 5 | 5 | 5 | 6 | 5.5 | 5.5 |
| Structure regularity | 3 | 5 | 4 | 5 | 5 | 5 | 5 |
| Structure fineness | 4.5 | 5 | 4 | 5 | 6 | 5 | 4.5 |

TABLE 2-continued

|  | C1 | C2 | E1 | E2 | E3 | E4 | E5 |
|---|---|---|---|---|---|---|---|
| Structure softness | 6 | 5 | 5 | 6 | 6 | 6 | 7 |
| Specific volume | 6 | 5 | 6 | 7 | 5.5 | 6.5 | 6 |
| SWEETNESS BREAD CRUMB | 1 | 5 | 3.5 | 3.5 | 3.5 | 5.5 | 5 |

The high sugar bread in column C2 has been taken as referent and received a score of 5 for all attributes, except for dough volume. A higher gives indicates an improvement, whereas a lower score than 5 indicates a less good result. For dough volume, the referent bread (C2) was 100%.

The results show that HFCS can be replaced by a sugar replacement system according to the invention to bake a sweet bread having satisfactory processing attributes and product attributes. The attributes are generally similar to the dough/bread made with HFSC or better. In particular, it is found that an increased oven spring is feasible, leading to a higher load volume. Regarding crust colour, the colour was generally higher than for the sugar-free bread, but lower than for the bread containing 12 wt. % HFCS. However, if desired, a similarly dark colour as for a bread containing HFCS can be obtained by providing the dough with an amyloglucosidase, in a manner known per se.

It was also extensively evaluated whether similar results were obtained if only one or two ingredients selected from the fructan, inulinase and invertase was used. Even though with just one or two of the ingredients some improvements could be obtained with regard to general bread quality attributes, there was no sweetness generated at all in any of these tests. This clearly indicates that all three ingredients, fructan, inulinase and invertase are needed together in order to generate sweetness in sugar free bread.

The invention claimed is:

1. Bread dough, comprising:
    one or more fructans having two or more fructosyl moieties linked by a beta(2,1) bond, selected from the group consisting of inulins and inulin hydrolysates, being in the range of 1-10 wt. %, based on dry weight,
    one or more extracellular inulinases (EC 3.2.1.7 and EC 3.2.1.80) wherein the inulinase content is 5-1,000 ppm, and
    one or more extracellular invertases (3.2.1.26), the bread dough having a total added sugar content of 0-15 wt. %, based on dry weight and/or a total sugar content of 0-20 wt. %, based on dry weight.

2. Bread dough according to claim 1, wherein the dough comprises an inulinase having endo-inulinase activity and another inulinase having exo-inulinase activity or an inulinase have both endo-inulinase activity exo-inulinase activity.

3. Bread dough according to claim 1, wherein the inulinase content is 10-200 ppm, on dry weight basis.

4. Bread dough according to claim 1, wherein the invertase content is 50-300 ppm, on dry weight basis.

5. Bread dough according to claim 1, wherein the dough and the bread coming from that dough have a sweetness that is about the same or higher than the sweetness of a reference dough and bread coming from that dough wherein said fructan or fructans have been replaced by a same amount of sucrose and having otherwise the same composition.

6. Bread dough according to claim 1, wherein the dough comprises yeast.

7. Bread dough according to claim 1, wherein the dough comprises one or more enzymes selected from the group consisting of amylases, phospholipases, proteases, amyloglucosidases, cellulases, glucose-oxidases, glycolipases, hemicellulases, lipases, mannanases, pentosanases and xylanases.

8. Bread dough according to claim 1, wherein the dough is essentially free of artificial sweeteners.

9. Bread dough according to claim 1, wherein the bread dough is wheat bread dough.

10. Bread dough according to claim 1, having a total added sugar content of 0-10 wt. %, based on dry weight and a total sugar content of 0-15 wt. %, based on dry weight.

11. Bread dough according to claim 1, having a total added sugar content of 0-5 wt. %, based on dry weight and a total sugar content of 0-10 wt. %, based on dry weight.

12. Method for preparing a dough according to claim 1, wherein the dough is made by a straight dough method or wherein the dough is made by a sponge and dough method, wherein a dough is made without adding sugar or adding sugar in an amount of up to 5 wt. % based on dry weight.

13. Method for baking a bread, comprising providing a bread dough according to claim 1 and baking the dough.

14. A baked bread, made from a bread dough according to claim 1.

15. A baked bread according to claim 14 that is free of any high intensity sweeteners and further added sweeteners.

16. A powdered bread pre-mix, comprising flour, one or more fructans having two or more fructosyl moieties linked by a beta(2,1) bond, one or more extracellular inulinases (EC 3.2.1.7) and one or more extracellular invertases (3.2.1.26), wherein:
said pre-mix has a total sugar content of 0-20 wt. %,
said fructans are selected from the group consisting of inulins and inulin hydrolysates and have a total content in the range of 1-10 wt. %,
the total inulinase content is 5-1,000 ppm, and
the total invertase content is 5-2,000 ppm.

17. Bread pre-mix according to claim 16 having a total sugar content of 0-10 wt. %.

18. Bread pre-mix according to claim 16, which is free of any high intensity sweeteners and further added sweeteners.

19. Bread pre-mix according to claim 16, wherein the weight to weight ratio of inulinase to invertase is in the range of 1:10 to 4:1.

20. Bread pre-mix according to claim 16, wherein the weight to weight ratio of fructan to the sum of inulinase plus invertase is in the range of 10:1 to 20,000:1.

21. Bread dough according to claim 1, wherein the fructan is added fructan.

22. Bread dough according to claim 1, wherein the inulin or inulin hydrolysate source is chicory.

23. Bread dough according to claim 1, wherein inulin and inulin hydrolysate source is selected from the group consisting of Jerusalem artichoke, onion, bananas, garlic, and asparagus.

* * * * *